US010380356B2

(12) United States Patent
Yan

(10) Patent No.: US 10,380,356 B2
(45) Date of Patent: Aug. 13, 2019

(54) OPERATING SYSTEM PARTITION PROTECTING SYSTEM, PROTECTING DEVICE, AND TERMINAL

(71) Applicant: YULONG COMPUTER TELECOMMUNICATION SCIENTIFIC (SHENZHEN) CO., LTD., Shenzhen (CN)

(72) Inventor: Qing-Zhou Yan, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 239 days.

(21) Appl. No.: 15/468,126

(22) Filed: Mar. 24, 2017

(65) Prior Publication Data
US 2017/0193238 A1    Jul. 6, 2017

Related U.S. Application Data

(63) Continuation-in-part of application No. PCT/CN2014/087591, filed on Sep. 26, 2014.

(51) Int. Cl.
*G06F 21/60* (2013.01)
*G06F 3/06* (2006.01)
(Continued)

(52) U.S. Cl.
CPC .......... *G06F 21/602* (2013.01); *G06F 3/0604* (2013.01); *G06F 3/0623* (2013.01);
(Continued)

(58) Field of Classification Search
CPC ............ G06F 21/602; G06F 17/30233; G06F 3/0631; G06F 3/0643; G06F 3/0683;
(Continued)

(56) References Cited

U.S. PATENT DOCUMENTS

| 2005/0076041 A1* | 4/2005 | Stakutis ................. G06F 16/16 |
| 2009/0063795 A1* | 3/2009 | Yueh ...................... G06F 3/0608 711/162 |

(Continued)

*Primary Examiner* — Ashokkumar B Patel
*Assistant Examiner* — Quazi Farooqui
(74) *Attorney, Agent, or Firm* — ScienBiziP, P.C.

(57) ABSTRACT

An operating system partition protecting method includes: creating a virtual memory space which is mounted on a first directory; mounting a physical storage space that actually stores a system file of an operating system on a second directory; creating a user-state file system on a mounting point of an operating system partition to be protected, and controlling the user-state file system to monitor a request event of an operation on the file system in the operating system partition; determining a target file corresponding to the request event, accessing the second directory to read a target file in the physical storage space or accessing the first directory to carry out a writing operation on the target file into the virtual memory space. The present disclosure also provides an operating system partition protecting device. The present disclosure can protect a system storage partition, and avoid tampering of system files by malicious programs.

15 Claims, 4 Drawing Sheets

(51) Int. Cl.
  *G06F 17/30*     (2006.01)
  *G06F 21/62*     (2013.01)
  *G06F 16/16*     (2019.01)
  *G06F 16/188*    (2019.01)
  *G06F 9/44*      (2018.01)

(52) U.S. Cl.
  CPC .......... *G06F 3/0631* (2013.01); *G06F 3/0643* (2013.01); *G06F 3/0683* (2013.01); *G06F 9/44* (2013.01); *G06F 16/16* (2019.01); *G06F 16/188* (2019.01); *G06F 21/62* (2013.01); G06F 2221/2107 (2013.01); *H04L 2209/12* (2013.01)

(58) Field of Classification Search
  CPC ................. G06F 3/0604; G06F 3/0623; G06F 17/30115; G06F 21/62; G06F 9/44; G06F 2221/2107; G06F 21/60; G06F 3/06; G06F 17/30; H04L 2209/12
  USPC .......................................... 713/193, 150, 165
  See application file for complete search history.

(56) References Cited

U.S. PATENT DOCUMENTS

| | | | |
|---|---|---|---|
| 2013/0133051 A1* | 5/2013 | Riemers ................. | H04L 63/08 726/7 |
| 2013/0152207 A1* | 6/2013 | Cui ........................ | G06F 21/53 726/26 |
| 2014/0006806 A1* | 1/2014 | Corella ............... | G06F 21/6218 713/193 |

\* cited by examiner

OPERATING SYSTEM PARTITION PROTECTING SYSTEM, PROTECTING DEVICE, AND TERMINAL

CROSS-REFERENCE TO RELATED APPLICATIONS

This application is a continuation-in-part of International Application No. PCT/CN2014/087591, filed on Sep. 26, 2014.

FIELD

The present disclosure relates to the technical field of terminals, in particular to an operating system partition protecting method, an operating system partition protecting device, and a terminal.

BACKGROUND

In mobile phone systems of some manufacturers, if a non-system file is detected, a deleting operation of the file may be executed at next startup; or a file that is replaced by source files may be extracted from a certain backed-up partition or a data packet.

The following problems exist in prior art:

Backup system partitions are needed or all applications and programs need to be duplicated, thus, a large amount of storage space is occupied, and the storage spaces are fixed in size.

For example, in an ANDROID system, partition space has more than 1 GB. No matter for the backup partition or for backing up the application programs, more than 1 GB storage space will be occupied.

A new technique is needed to protect a system storage partition, prevent the system files from tampering by malicious programs, and avoid wasting a large amount of storage space due to backing up the system partitions.

SUMMARY OF THE INVENTION

Based on the above problems, the present disclosure provides a novel technical scheme, which can protect a system storage partition, prevent the system files from being tampered with by malicious programs, and avoids wasting a large amount of storage space due to backing up the system partitions.

In view of the above, an operating system partition protecting method is disclosed which includes: creating a virtual memory space, and mounting the virtual memory space on a first directory; mounting a physical storage space that actually stores a system file of an operating system on a second directory; creating a user-state file system on a mounting point of an operating system partition to be protected, and controlling the user-state file system to monitor a request event of an operation on the file system in the operating system partition to be protected; determining a target file corresponding to the request event, accessing the second directory to read a target file in the physical storage space or accessing the first directory to carry out a writing operation on the target file into the virtual memory space, according to the request event and the target file.

In the above disclosure, a virtual memory space is created and mounted on the first directory, the actual physical storage space is mounted on the second directory, and a user-state file system is created on a mounting point of an operating system partition to be protected. Thus, when the user-state file system monitors a request event of performing an operation of the file system on such operating partition, corresponding operations are performed according to different request events. Specifically, when the request event is a read operation, the read operation is directly performed in the physical storage space; when the request event is a writing operation, the file in the physical storage space is not directly operated. Instead, the writing operation is performed in the virtual memory space, to protect the operating system partition, prevent the system files from being tampered with by the malicious programs, and avoid the waste of a large amount of storage space due to backing up the system partitions.

In the above disclosure, preferably, the method further includes: determining whether the request event is a read operation; searching a physical storage space corresponding to the second directory, to find a first file that has a same path and same file name as the target file when the request event is a read operation. The read operation is performed on the first file and a writing operation is performed on the target file in the virtual memory space corresponding to the first directory, when the request event is a writing operation.

In the above disclosure, when the request event is a read operation, the read operation is directly performed on a same path and same-name file in the physical storage space. When the request event is a writing operation, the writing operation is not performed on the file in the physical storage space, but is performed in the virtual memory space instead. Thus, the operating system partition can be protected, the malicious programs are prevented from tampering with the system files, and a large amount of storage space is avoided to be wasted due to backing up the system partition.

In the above disclosure, preferably, performing the writing operation on the target file in the virtual memory space corresponding to the first directory includes determining whether the writing operation is a new file writing operation. When the writing operation is a new file writing operation, a new file is written into the virtual memory space corresponding to the first directory. When the writing operation is a modification operation of an original file, the target file is copied from the physical memory space corresponding to the second directory to the virtual memory space corresponding to the first directory. The modification operation is carried out on the target file in the virtual memory space.

In the above disclosure, when the writing operation is writing a new file, the writing operation can be performed in the virtual memory space. There may be no original file in the virtual memory space when the writing operation is modifying the original file, thus the original file needs to be copied from the physical storage space to the virtual memory space. The writing operation is then completed in the virtual memory space.

In the above disclosure, preferably, the physical storage space is a partition or a storage area in the operating system, and the virtual memory space is a memory storage area or a persistent storage region in the operating system.

In the above disclosure, the virtual memory space may be a memory storage area, so that the writing operation executed in the virtual memory space can be automatically wiped or cleared when the virtual memory space is restarted, to avoid waste of the storage space. The virtual memory space may also be a persistent storage space, thus the writing operation in the virtual memory space is stored, and is emptied reboot, to meet the different requirements of the user.

In the above disclosure, preferably, the method further includes encrypting the system file in the physical storage space by using a preset encryption algorithm.

In the above disclosure, in order to further ensure that a malicious program is prevented from directly tampering with the real physical storage area, the files in the physical storage space can also be encrypted, or the file system can be customized.

According to another aspect of the present disclosure, an operating system partition protecting device is further provided. The operating system partition protecting device includes: a creating unit, which creates a virtual memory space when detecting that a user space file system is started, and mounts the virtual memory space on a first directory; a mounting unit, which mounts a physical storage space that actually stores a system file of an operating system on a second directory; a monitoring unit, which creates a user-state file system on a mounting point of an operating system partition to be protected, and controls the user-state file system to monitor a request event of an operation on the file system in the operating system partition to be protected; a processing unit, which determines a target file corresponding to the request event, accesses the second directory to read a target file in the physical storage space or the first directory to carry out a writing operation on the target file into the virtual memory space according to the request event and the target file.

In the above disclosure, a virtual memory space is created and mounted on the first directory, the actual physical storage space is mounted on the second directory, and a user-state file system is created on a mounting point of an operating system partition to be protected. Thus, when the user-state file system monitors a request event of performing an operation of the file system on such operating partition, corresponding operations are performed according to different request events. Specifically, when the request event is a read operation, the read operation is directly performed in the physical storage space; when the request event is a writing operation, the file in the physical storage space is not directly operated. Instead, the writing operation is performed in the virtual memory space, to protect the operating system partition, prevent the system files from being tampered with by the malicious programs, and avoid the waste of a large amount of storage space due to backing up the system partitions.

The above disclosure, preferably, further includes: a determining unit, which determines whether the request event is a read operation. The processing unit is further configured to search a physical storage space corresponding to the second directory, to find a first file that has a same path and same file name as the target file when the request event is a read operation. The read operation is performed on the first file. The processing unit is further configured to perform a writing operation on the target file in the virtual memory space corresponding to the first directory, when the request event is a writing operation.

In the above disclosure, when the request event is a read operation, the read operation is directly performed on a same path and same-name file in the physical storage space. When the request event is a writing operation, the writing operation is not performed on the file in the physical storage space, but is performed in the virtual memory space instead. Thus, the operating system partition can be protected, the malicious programs are prevented from tampering with the system files, and a large amount of storage space is avoided to be wasted due to backing up the system partition.

In the above disclosure, preferably, the determining unit is further configured to determine whether the writing operation is a new file writing operation. The processing unit is further configured to write a new file into the virtual memory space corresponding to the first directory when the writing operation is a new file writing operation. When the writing operation is a modification operation an original file, the processing unit is further configured to copy the target file from the physical memory space corresponding to the second directory to the virtual memory space corresponding to the first directory, and carry out a modification operation on the target file in the virtual memory space.

In the above disclosure, when the writing operation is writing a new file, the writing operation can be performed in the virtual memory space. There may be no original file in the virtual memory space when the writing operation is modifying the original file, thus the original file needs to be copied from the physical storage space to the virtual memory space. The writing operation is then completed in the virtual memory space.

In the above disclosure, preferably, the physical storage space is a partition or a storage area in the operating system, and the virtual memory space is a memory storage area or a persistent storage region in the operating system.

In the above disclosure, the virtual memory space may be a memory storage area, so that the writing operation executed in the virtual memory space can be automatically wiped or cleared when the virtual memory space is restarted, to avoid waste of the storage space. The virtual memory space may also be a persistent storage space, thus the writing operation in the virtual memory space is stored, and is emptied on reboot, to meet the different requirements of the user.

The above disclosure, preferably, further includes an encryption unit, which encrypts the system file in the physical storage space by using a preset encryption algorithm.

In the above disclosure, in order to further ensure that a malicious program is prevented from directly tampering with the real physical storage area, the files in the physical storage space can also be encrypted, or the file system can be customized.

According to a further aspect of the present disclosure, a terminal is also provided. The terminal includes any one of the operating system partition protecting devices as described above. The terminal has the same technical effect as the operating system partition protecting devices, and is not repeated herein.

The above disclosures can protect a system storage partition, prevent tampering with the system files by the malicious programs, and avoid wasting a large amount of storage space due to backing up the system partitions.

DETAILED DESCRIPTION

In order to better understand the above objects, features, and advantages, the present disclosure will be further described in detail in the following with reference to the accompanying drawings and the detailed description. It should be noted that, in the case of no conflict, the embodiments of the application and the features in the embodiments can be combined with each other.

In the following description, numerous specific details are set forth in order to provide a thorough understanding of the present disclosure. However, the present disclosure may also be implemented in ways other than those described herein, accordingly, the scope of the present disclosure is not to be limited by the specific embodiments disclosed below.

Figure 1:
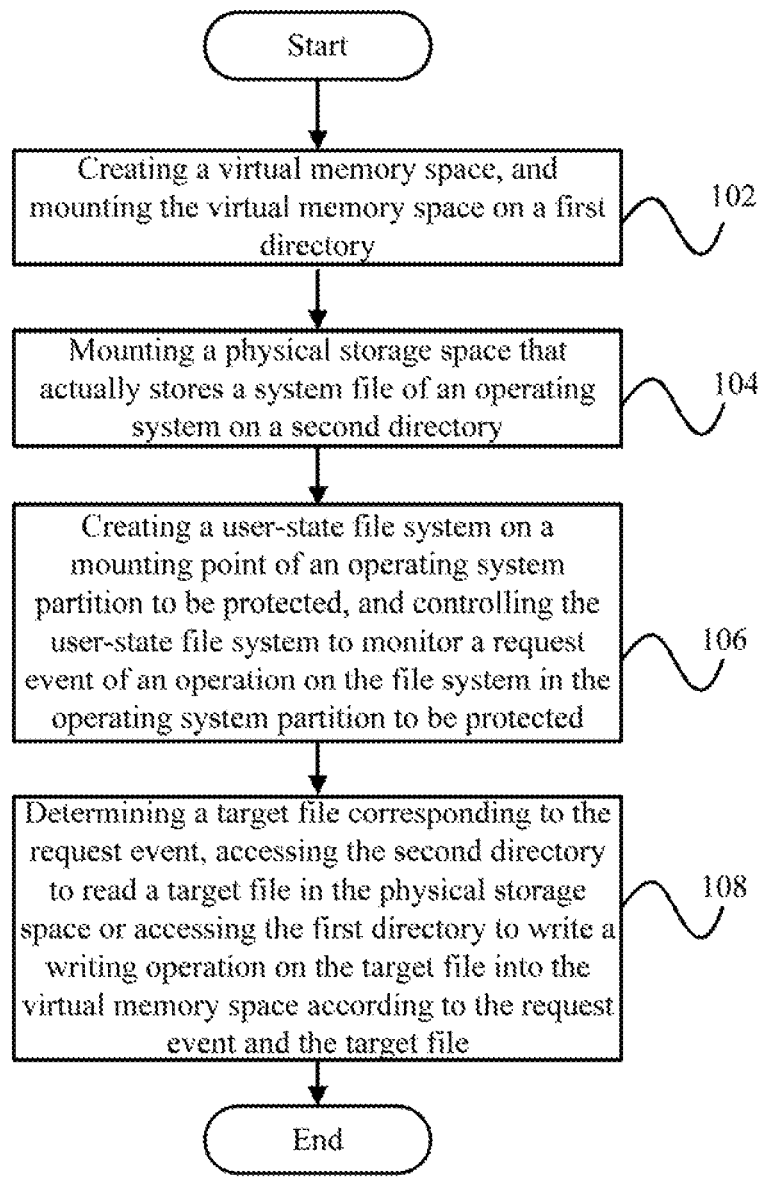
FIG. 1 illustrates a flow diagram of an operating system partition protecting method according to one embodiment of the present disclosure.

FIG. 1 illustrates a flow diagram of an operating system partition protecting method according to one embodiment of the present invention.

As shown in FIG. 1, an operating system partition protecting method according to one embodiment of the present disclosure includes: step 102, creating a virtual memory space, and mounting the virtual memory space on a first directory; step 104, mounting a physical storage space that actually stores a system file of an operating system on a second directory; step 106, creating a user-state file system on a mounting point of an operating system partition to be protected, and controlling the user-state file system to monitor a request event of an operation on the file system in the operating system partition to be protected; step 108, determining a target file corresponding to the request event, accessing the second directory to read a target file in the physical storage space or accessing the first directory to carry out a writing operation on the target file into the virtual memory space, according to the request event and the target file.

In the above disclosure, a virtual memory space is created and mounted on the first directory, the actual physical storage space is mounted on the second directory, and a user-state file system is created on a mounting point of an operating system partition to be protected. Thus, when the user-state file system monitors a request event of performing an operation of the file system on such operating partition, corresponding operations are performed according to different request events. Specifically, when the request event is a read operation, the read operation is directly performed in the physical storage space; when the request event is a writing operation, the file in the physical storage space is not directly operated. Instead, the writing operation is performed in the virtual memory space, to protect the operating system partition, prevent the system files from being tampered with by the malicious programs, and avoid the waste of a large amount of storage space due to backing up the system partitions.

In the above disclosure, preferably, the method further includes: determining whether the request event is a read operation; searching a physical storage space corresponding to the second directory, to find a first file that has a same path and same file name as the target file when the request event is a read operation. The read operation is performed on the first file and a writing operation is performed on the target file in the virtual memory space corresponding to the first directory, when the request event is a writing operation.

In the above disclosure, when the request event is a read operation, the read operation is directly performed on a same path and same-name file in the physical storage space. When the request event is a writing operation, the writing operation is not performed on the file in the physical storage space, but is performed in the virtual memory space instead. Thus, the operating system partition can be protected, the malicious programs are prevented from tampering with the system files, and a large amount of storage space is avoided to be wasted due to backing up the system partition.

In the above disclosure, preferably, performing the writing operation on the target file in the virtual memory space corresponding to the first directory includes determining whether the writing operation is a w new file writing operation. When the writing operation is a new file writing operation, a new file is written into the virtual memory space corresponding to the first directory. When the writing operation is a modification operation of an original file, the target file is copied from the physical memory space corresponding to the second directory to the virtual memory space corresponding to the first directory. The modification operation is carried out on the target file in the virtual memory space.

In the above disclosure, when the writing operation is writing a new file, the writing operation can be performed in the virtual memory space. There may be no original file in the virtual memory space when the writing operation is modifying the original file, thus the original file needs to be copied from the physical storage space to the virtual memory space. The writing operation is then completed in the virtual memory space.

In the above disclosure, preferably, the physical storage space is a partition or a storage area in the operating system, and the virtual memory space is a memory storage area or a persistent storage region in the operating system.

In the above disclosure, the virtual memory space may be a memory storage area, so that the writing operation executed in the virtual memory space can be automatically wiped or cleared when the virtual memory space is restarted, to avoid waste of the storage space. The virtual memory space may also be a persistent storage space, thus the writing operation in the virtual memory space is stored, and is emptied reboot, to meet the different requirements of the user.

In the above disclosure, preferably, the method further includes encrypting the system file in the physical storage space by using a preset encryption algorithm.

In the above disclosure, in order to further ensure that a malicious program is prevented from directly tampering with the real physical storage area, the files in the physical storage space can also be encrypted, or the file system can be customized.

Figure 2:
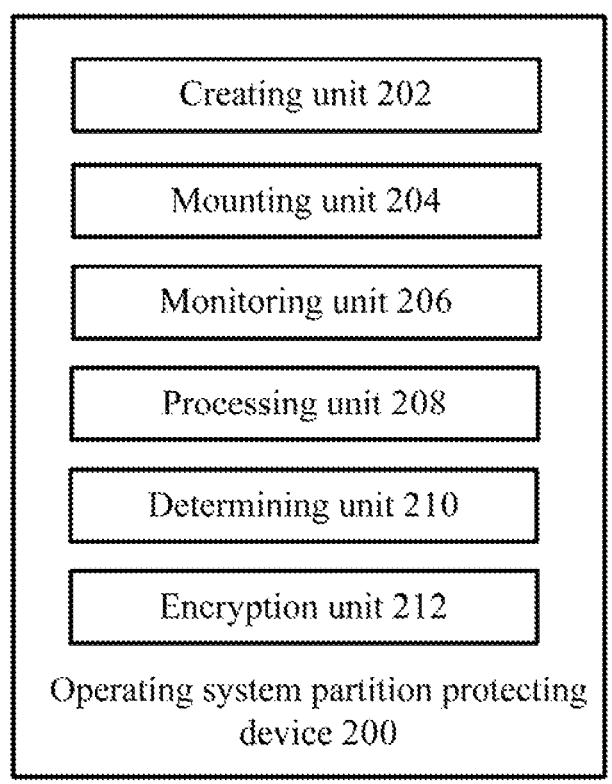
FIG. 2 illustrates a block diagram of an operating system partition protecting device according to one embodiment of the present disclosure.

FIG. 2 illustrates a block diagram of an operating system partition protecting device according to one embodiment of the present invention.

As shown in FIG. 2, an operating system partition protecting device 200 according to one embodiment of the present disclosure includes: a creating unit 202, which creates a virtual memory space when detecting that a user space file system is started, and mounts the virtual memory space on a first directory; a mounting unit 204, which mounts a physical storage space that actually stores a system file of an operating system on a second directory; a monitoring unit 206, which creates a user-state file system on a mounting point of an operating system partition to be protected, and controls the user-state file system to monitor a request event of an operation on the file system in the operating system partition to be protected; a processing unit 208, which determines a target file corresponding to the request event, accesses the second directory to read a target file in the physical storage space or the first directory to carry out a writing operation on the target file into the virtual memory space according to the request event and the target file.

In the above disclosure, a virtual memory space is created and mounted on the first directory, the actual physical storage space is mounted on the second directory, and a user-state file system is created on a mounting point of an operating system partition to be protected. Thus, when the user-state file system monitors a request event of performing an operation of the file system on such operating partition, corresponding operations are performed according to different request events. Specifically, when the request event is a read operation, the read operation is directly performed in the physical storage space; when the request event is a writing operation, the file in the physical storage space is not directly operated. Instead, the writing operation is performed in the virtual memory space, to protect the operating system partition, prevent the system files from being tampered with by the malicious programs, and avoid the waste of a large amount of storage space due to backing up the system partitions.

The above embodiment, preferably, further includes: a determining unit 210, which determines whether the request event is a read operation. The processing unit 208 is further configured to: search a physical storage space corresponding to the second directory, to find a first file that has a same path and same file name as the target file when the request event is a read operation. The read operation is performed on the first file. The processing unit 208 is further configured to perform a writing operation on the target file in the virtual memory space corresponding to the first directory, when the request event is a writing operation.

In the above disclosure, when the request event is a read operation, the read operation is directly performed on a same path and same-name file in the physical storage space. When the request event is a writing operation, the writing operation is not performed on the file in the physical storage space, but is performed in the virtual memory space instead. Thus, the operating system partition can be protected, the malicious programs are prevented from tampering with the system files, and a large amount of storage space is avoided to be wasted due to backing up the system partition.

In the above embodiment, preferably, the determining unit 210 is further configured to determine whether the writing operation is a new file writing operation. The processing unit 208 is further configured to write a new file into the virtual memory space corresponding to the first directory when the writing operation is a new file writing operation. When the writing operation is a modification operation an original file, the processing unit 208 is further configured to copy the target file from the physical memory space corresponding to the second directory to the virtual memory space corresponding to the first directory, and carry out a modification operation on the target file in the virtual memory space.

In the above disclosure, when the writing operation is writing a new file, the writing operation can be performed in the virtual memory space. There may be no original file in the virtual memory space when the writing operation is modifying the original file, thus the original file needs to be copied from the physical storage space to the virtual memory space. The writing operation is then completed in the virtual memory space.

In the above disclosure, preferably, the physical storage space is a partition or a storage area in the operating system, and the virtual memory space is a memory storage area or a persistent storage region in the operating system.

In the above disclosure, the virtual memory space may be a memory storage area, so that the writing operation executed in the virtual memory space can be automatically wiped or cleared when the virtual memory space is restarted, to avoid waste of the storage space. The virtual memory space may also be a persistent storage space, thus the writing operation in the virtual memory space is stored, and is emptied on reboot, to meet the different requirements of the user.

The above embodiment, preferably, further includes: an encryption unit 212, which encrypts the system file in the physical storage space by using a preset encryption algorithm.

In the above disclosure, in order to further ensure that a malicious program is prevented from directly tampering with the real physical storage area, the files in the physical storage space can also be encrypted, or the file system can be customized.

Figure 3:
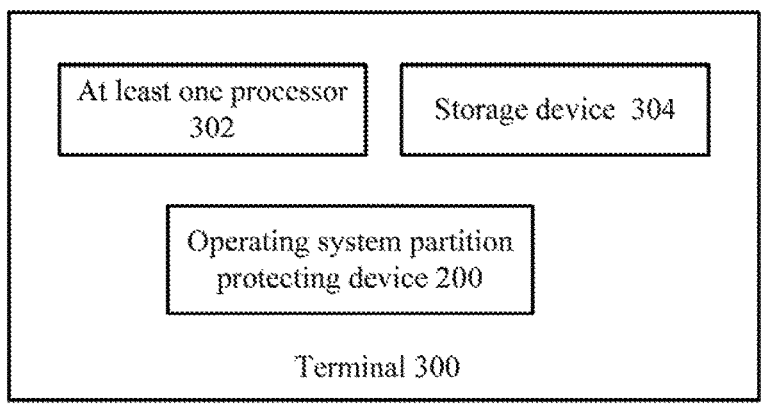
FIG. 3 illustrates a block diagram of a terminal according to one embodiment of the present disclosure.

FIG. 3 illustrates a block diagram of a terminal according to one embodiment of the present invention.

As shown in FIG. 3, a terminal 300 according to one embodiment of the present disclosure includes any one of the operating system partition protecting devices 200 described above.

The terminal 300 further includes at least one processor 302 and a storage device 304. The creating unit 202, the mounting unit 204, the monitoring unit 206, the processing unit 208, the determining unit 210, the encryption unit 212, and other units or subunits as described above, include computerized instructions in the form of one or more computer-readable programs that can be stored in the storage device 304, and can be implemented by the at least one processor 302.

The at least one processor 302 is used to execute a plurality of units or subunits in the terminal 300, such as an operating system, installed in the terminal 300. The storage devices 304 store the computerized instructions of a plurality of units or subunits in the terminal 300 having base station functions, and one or more programs, such as the operating system and applications of the terminal 300. The storage device 304 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. It may be understood that the terminal 300 may include more or fewer components than described, or have a different configuration of the various components.

The following embodiment takes an ANDROID system as an example (the embodiment is not limited to ANDROID system, any system that uses Linux or have file system similar to FUSE can be used), to describe the present disclosure in detail.

The core program of the ANDROID system and all the application APK files are stored in the/system partition. The partition is in a read-only protection state by default, and an ordinary user cannot modify files under the/system. However, in the system root, a root tool or malicious software can remount the/system partition into a writable state, thus the file in the system can be modified or the malicious program is implanted.

Figure 4:
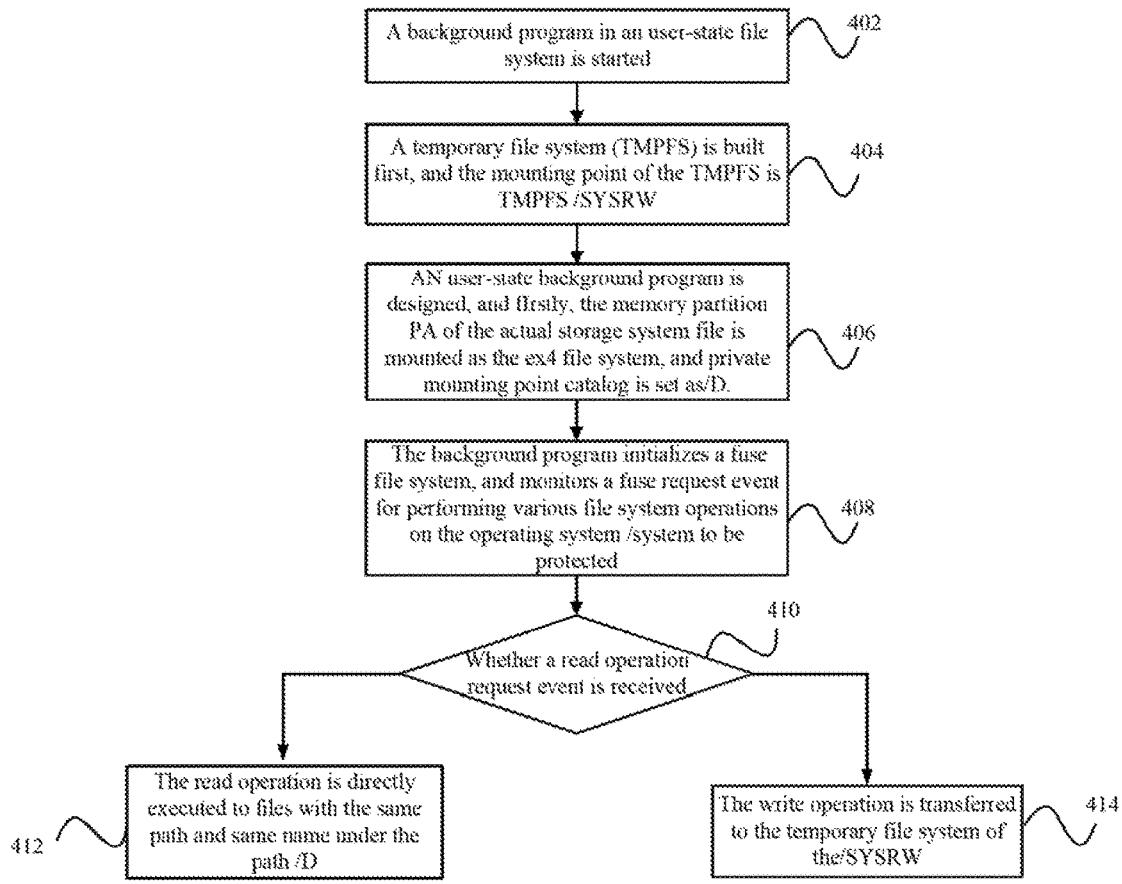
FIG. 4 illustrates a detailed flow diagram of the operating system partition protecting method according to one embodiment of the present disclosure.

As shown in FIG. 4, the present disclosure avoids the problems as mentioned above by the following steps. (The file system preset in the factory is burned and written in a PA partition in the memory. It is assumed here that the file system is ex4).

Step 402, a background program in a user-state file system is started.

Step 404, a temporary file system (TMPFS) is built first, and the mounting point of the TMPFS is TMPFS/SYSRW.

In step 406, a user-state background program is designed. Firstly, the PA partition of the actual storage system file is mounted on the ex4 file system. The mounting point is private and hidden, and is invisible to other users. The private mounting point directory is set as/D.

Step 408, the background program initializes a fuse file system, and monitors a fuse request event for performing various file system operations on the operating system/ system requiring protection.

Step 410, it is determined whether a read operation request event is received. When a determination result is yes, step 412 is executed. When the determination result is no, step 414 is executed.

Step 412, when the specific read operation request is obtained, the read operation is directly executed on files having the same path and same name under the path/D.

Step 414, when a specific writing operation request is obtained, the writing operation is transferred to the temporary file system of the/SYSRW.

Specifically, common read type events can include FUSE_LOOKUP, FUSE_GETATTR, FUSE_OPEN(R), FUSE_READ, FUSE_STATFS, FUSE_SETXATTR, FUSE_GETXATTR, FUSE_LISTXATTR, FUSE_OPENDIR, FUSE_READDIR, and FUSE_RELEASEDIR.

Common write type events can include FUSE_SETATTR, FUSE_OPEN(W), FUSE_MKNOD, FUSE_MKDIR, FUSE_UNLINK, FUSE_RMDIR, FUSE_RENAME, FUSE_WRITE, and FUSE_REMOVEXATTR.

Through the above steps, the system partition can be protected, and a malicious program can be prevented from damaging with the system partition. Thus, it can be avoided that the system cannot work normally, the manufacturer cannot realize the value-added of the software service, and the replacement system program is easy to cause a crash, which may bright a customer loss to the manufacturer.

The technical embodiments of the present disclosure is described in detail above in combination with the accompanying drawings. Using the present disclosure, a system storage partition can be protected, the malicious programs are prevented from tampering with the system files, and meanwhile, a large amount of storage space is avoided to be wasted due to backing up the system partition.

The present disclosure also provides a program product stored on a non-volatile machine readable medium to protect operating system partitions. The program product includes machine executable instructions that cause a computer system to perform: creating a virtual memory space, and mounting the virtual memory space on a first directory; mounting a physical storage space of a system file in an actual storage operating system on a second directory; creating a user-state file system on a mounting point of an operating system partition to be protected, and controlling the user-state file system to monitor a request event for file system operation on the operating system partition to be protected; determining a target file corresponding to the request event, accessing the second directory to read a target file in the physical storage space, or accessing the first directory to carry out a writing operation on the target file into the virtual memory space, according to the request event and the target file.

According to an embodiment of the present disclosure, a non-volatile machine readable medium is also provided which store a program product for protect operating system partitions. The program product includes machine executable instructions that cause a computer system to perform: creating a virtual memory space, and mounting the virtual memory space on a first directory; mounting a physical storage space of a system file in an actual storage operating system on a second directory; creating a user-state file system on a mounting point of an operating system partition to be protected, and controlling the user-state file system to monitor a request event for file system operation on the operating system partition to be protected; determining a target file corresponding to the request event, accessing the second directory to read a target file in the physical storage space, or accessing the first directory to carry out a writing operation on the target file into the virtual memory space, according to the request event and the target file.

According to the embodiment of the present disclosure, a machine-readable program is further provided. The program enables the machine to execute the operating system partition protecting method according to any one of the embodiments described above.

According to one embodiment of the present disclosure, there is also provided a storage medium having a machine readable program stored therein. The machine readable program causes the machine to execute the operating system partition protecting method according to any one of the embodiments described above.

The above descriptions are only preferred embodiments of the present disclosure, and are not used to limit the present disclosure. It will be apparent to those skilled in the art that various modifications and variations can be made in the present disclosure. Any modification or modification made without departing from the spirit and principle of the present disclosure can be made without departing from the spirit and principle of the present disclosure, and equivalent substitutions, improvements and the like are intended to be included within the scope of the present invention.

What is claimed is:

1. An operating system partition protecting method, executing in a terminal, comprising:
    creating a virtual memory space, and mounting the virtual memory space on a first directory, wherein the virtual memory space is a memory storage area in an operating system of the terminal, a writing operation executed in the virtual memory space is automatically wiped or cleared when the virtual memory space is restarted, or wherein the virtual memory space is a persistent storage region in the operating system, a writing operation executed in the virtual memory space is stored and is emptied reboot;
    mounting a physical storage space that actually stores a system file of the operating system on a second directory that is private and hidden;
    creating a user-state file system on a mounting point of an operating system partition to be protected, and controlling the user-state file system to monitor a request event of an operation on the file system in the operating system partition to be protected;
    determining a target file corresponding to the request event, accessing the second directory to read a target file in the physical storage space or accessing the first directory to carry out a writing operation on the target file into the virtual memory space according to the request event and the target file.

2. The method according to claim 1, further comprising:
    determining whether the request event is a read operation;
    searching a physical storage space corresponding to the second directory, to find a first file that has a same path and same file name as the target file when the request event is a read operation, and performing the read operation on the first file;

performing the writing operation on the target file in the virtual memory space corresponding to the first directory, when the request event is a writing operation.

3. The method according to claim 2, wherein performing the writing operation on the target file in the virtual memory space corresponding to the first directory comprises:
   determining whether the writing operation is a new file writing operation;
   when the writing operation is a new file writing operation, writing a new file into the virtual memory space corresponding to the first directory;
   when the writing operation is a modification operation of an original file, copying the target file from the physical memory space corresponding to the second directory to the virtual memory space corresponding to the first directory, and performing a modification operation on the target file in the virtual memory space.

4. The method according to claim 1, wherein the physical storage space is a partition or a storage area in the operating system.

5. The method according to claim 1, further comprising:
   encrypting the system file in the physical storage space by using a preset encryption algorithm.

6. A terminal, comprises:
   at least one processor; and
   a storage device storing a plurality of instructions, which when executed by the processor, causes the at least one processor to:
   create a virtual memory space when detecting that a user space file system is started, and mount the virtual memory space on a first directory, wherein the virtual memory space is a memory storage area in an operating system of the terminal, a writing operation executed in the virtual memory space is automatically wiped or cleared when the virtual memory space is restarted, or wherein the virtual memory space is a persistent storage region in the operating system, a writing operation executed in the virtual memory space is stored and is emptied reboot;
   mount a physical storage space of a system file in an actual storage operating system on a second directory that is private and hidden;
   create a user-state file system on a mounting point of an operating system partition to be protected, and control the user-state file system to monitor a request event for file system operation on the operating system partition to be protected;
   determine a target file corresponding to the request event, access the second directory to read a target file in the physical storage space, or access the first directory to carry out a writing operation on the target file into the virtual memory space, according to the request event and the target file.

7. The terminal according to claim 6, the at least one processor further to:
   determine whether the request event is a read operation;
   when the request event is a read operation, search a physical storage space corresponding to the second directory, to find a first file which has the same path and the same file name as the target file, and perform the read operation on the first file; when the request event is a writing operation, perform the writing operation to the target file in the virtual memory space corresponding to the first directory.

8. The terminal according to claim 7, the at least one processor further to:
   determine whether the writing operation is a new file writing operation;
   when the writing operation is a new file writing operation, write a new file into the virtual memory space corresponding to the first directory according to the new file writing operation;
   when the writing operation is a modification operation of an original file, copy the target file from the physical memory space corresponding to the second directory to the virtual memory space corresponding to the first directory, and perform a modification operation on the target file in the virtual memory space.

9. The terminal according to claim 6, wherein the physical storage space is a partition in the operating system or a storage area.

10. The terminal according to claim 6, further comprising:
    an encryption unit, which encrypts the system files in the physical storage space by a preset encryption algorithm.

11. A non-transitory computer-readable storage medium having stored thereon instructions that, when executed by at least one processor of a terminal, causing the processor to perform an operating system partition protecting method, the method comprising:
    creating a virtual memory space, and mounting the virtual memory space on a first directory, wherein the virtual memory space is a memory storage area in an operating system of the terminal, a writing operation executed in the virtual memory space is automatically wiped or cleared when the virtual memory space is restarted, or wherein the virtual memory space is a persistent storage region in the operating system, a writing operation executed in the virtual memory space is stored and is emptied reboot;
    mounting a physical storage space that actually stores a system file of an operating system on a second directory that is private and hidden;
    creating a user-state file system on a mounting point of an operating system partition to be protected, and controlling the user-state file system to monitor a request event of an operation on the file system in the operating system partition to be protected;
    determining a target file corresponding to the request event, accessing the second directory to read a target file in the physical storage space or accessing the first directory to carry out a writing operation on the target file into the virtual memory space according to the request event and the target file.

12. The non-transitory computer-readable storage medium according to claim 11, wherein the method further comprises:
    determining whether the request event is a read operation;
    searching a physical storage space corresponding to the second directory, to find a first file that has a same path and same file name as the target file when the request event is a read operation, and performing the read operation on the first file;
    performing the writing operation on the target file in the virtual memory space corresponding to the first directory, when the request event is a writing operation.

13. The non-transitory computer-readable storage medium according to claim 12, wherein performing the writing operation on the target file in the virtual memory space corresponding to the first directory comprises:
    determining whether the writing operation is a new file writing operation;

when the writing operation is a new file writing operation, writing a new file into the virtual memory space corresponding to the first directory;

when the writing operation is a modification operation of an original file, copying the target file from the physical memory space corresponding to the second directory to the virtual memory space corresponding to the first directory, and performing a modification operation on the target file in the virtual memory space.

14. The non-transitory computer-readable storage medium according to claim 11, wherein the physical storage space is a partition or a storage area in the operating system.

15. The non-transitory computer-readable storage medium according to claim 11, wherein the method further comprises:

encrypting the system file in the physical storage space by using a preset encryption algorithm.

* * * * *